US009423796B2

(12) United States Patent
Sullivan et al.

(10) Patent No.: US 9,423,796 B2
(45) Date of Patent: Aug. 23, 2016

(54) BOT HAVING HIGH SPEED STABILITY

(71) Applicant: Symbotic LLC, Wilmington, MA (US)

(72) Inventors: Robert Sullivan, Wilmington, MA (US); Stephen C. Toebes, Sunderland, MA (US); Forrest Buzan, Dunstable, MA (US); Andrew Eccles, Cambridge, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 14/629,003

(22) Filed: Feb. 23, 2015

(65) Prior Publication Data

US 2015/0309511 A1     Oct. 29, 2015

Related U.S. Application Data

(63) Continuation of application No. 13/326,447, filed on Dec. 15, 2011, now Pat. No. 8,965,619.

(60) Provisional application No. 61/423,359, filed on Dec. 15, 2010.

(51) Int. Cl.
    *G05D 1/00* (2006.01)
    *G05D 1/02* (2006.01)

(52) U.S. Cl.
    CPC .... *G05D 1/0272* (2013.01); *G05D 2201/0216* (2013.01)

(58) Field of Classification Search
    CPC .. G05D 1/0272; G05D 1/027; G05D 1/0278; G05D 2201/0216; G05D 1/0255
    USPC .......................................................... 701/23
    See application file for complete search history.

(56) References Cited

U.S. PATENT DOCUMENTS

| | | |
|---|---|---|
| 1,845,962 A | 2/1932 | Dorr |
| 1,887,667 A | 11/1932 | Wheeler |
| 2,606,508 A | 8/1952 | van Nes |
| 2,656,995 A | 10/1953 | Wolf |
| 2,673,689 A | 3/1954 | Bonanno |
| 2,792,234 A | 5/1957 | Page |
| 2,840,248 A | 6/1958 | Grove et al. |
| 2,877,575 A | 3/1959 | Stedt |
| 2,923,421 A | 2/1960 | de Senigon de Roumefort |
| 2,945,604 A | 7/1960 | Kroll |
| 2,996,621 A | 8/1961 | Barrett, Jr. |
| 3,161,303 A | 12/1964 | Burrows |
| 3,162,459 A | 12/1964 | Marmorine et al. |
| 3,269,744 A | 8/1966 | Dobson |

(Continued)

FOREIGN PATENT DOCUMENTS

| | | |
|---|---|---|
| DE | 4104527 | 8/1992 |
| DE | 10142395 | 11/2002 |

(Continued)

*Primary Examiner* — Jelani Smith
(74) *Attorney, Agent, or Firm* — Perman & Green, LLP

(57) ABSTRACT

An autonomous transport vehicle for transporting items in a storage and retrieval system is provided. The autonomous transport vehicle includes at least two drive wheels and a controller, where each drive wheel is independently driven and a drive wheel encoder is disposed adjacent each drive wheel. The controller, in communication with the drive wheel encoders, is configured to determine a kinematic state of the autonomous transport vehicle within the storage and retrieval system based on incremental data from the drive wheel encoders only and independent of drive wheel slippage.

28 Claims, 10 Drawing Sheets

(56) References Cited

U.S. PATENT DOCUMENTS

| | | |
|---|---|---|
| 3,369,648 A | 2/1968 | Wentz |
| 3,370,492 A | 2/1968 | Treff |
| 3,519,149 A | 7/1970 | Saul |
| 3,554,390 A | 1/1971 | Saul |
| 3,636,586 A | 1/1972 | Bollinger et al. |
| 3,677,421 A | 7/1972 | Kintner |
| 3,737,056 A | 6/1973 | Hathcock |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,782,565 A | 1/1974 | Doran et al. |
| 3,802,580 A | 4/1974 | Castaldi |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,786,229 A | 11/1988 | Henderson |
| 4,811,229 A | 3/1989 | Wilson |
| 4,812,985 A | 3/1989 | Hambrick et al. |
| 4,856,956 A | 8/1989 | Zur |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennan et al. |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,226,782 A | 7/1993 | Rigling |
| 5,238,100 A | 8/1993 | Rose, Jr. et al. |
| 5,265,944 A | 11/1993 | Gloceri |
| 5,271,703 A | 12/1993 | Lindqvist et al. |
| 5,273,392 A | 12/1993 | Bernard et al. |
| 5,281,901 A | 1/1994 | Yardley et al. |
| 5,286,157 A | 2/1994 | Vainio et al. |
| 5,307,888 A | 5/1994 | Urvoy |
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,362,197 A | 11/1994 | Rigling |
| 5,370,492 A | 12/1994 | Gleyze et al. |
| 5,377,851 A | 1/1995 | Asano et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,418,732 A | 5/1995 | McFadin |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Muller et al. |
| 5,525,884 A | 6/1996 | Sugiura et al. |
| 5,529,165 A | 6/1996 | Shupert |
| 5,564,880 A | 10/1996 | Lederer |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,667,230 A | 9/1997 | Riley et al. |
| 5,668,724 A | 9/1997 | Ehret et al. |
| 5,707,199 A | 1/1998 | Faller |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,801,506 A | 9/1998 | Netzler |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, III et al. |
| 5,839,872 A | 11/1998 | Goto et al. |
| 5,847,537 A | 12/1998 | Parmley, Sr. |

(56) References Cited

U.S. PATENT DOCUMENTS

| | | |
|---|---|---|
| 5,857,413 A | 1/1999 | Ward |
| 5,866,469 A | 2/1999 | Hays |
| 5,918,951 A | 7/1999 | Rudd, III |
| 5,927,926 A | 7/1999 | Yagi et al. |
| 5,928,058 A | 7/1999 | Francis et al. |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A * | 3/2000 | Kawakami ............ G05D 1/0227 701/23 |
| 6,061,607 A | 5/2000 | Bradley et al. |
| 6,062,942 A | 5/2000 | Ogihara |
| 6,116,842 A | 9/2000 | Harris et al. |
| 6,149,366 A | 11/2000 | Deandrea |
| 6,158,566 A | 12/2000 | Pollock |
| 6,220,676 B1 | 4/2001 | Rudd, III |
| 6,272,406 B2 | 8/2001 | Alofs et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,425,723 B1 | 7/2002 | Okada et al. |
| 6,439,131 B1 | 8/2002 | Higgins |
| 6,439,955 B1 | 8/2002 | Feketo |
| 6,503,043 B1 | 1/2003 | Smith et al. |
| 6,508,102 B1 | 1/2003 | Margolis et al. |
| 6,563,128 B2 | 5/2003 | Lublin et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,808,058 B2 | 10/2004 | Shiohara |
| 6,851,921 B2 | 2/2005 | Haag |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,058,866 B2 | 6/2006 | Flanagan et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,926 B2 | 11/2010 | Myeong et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara et al. |
| 7,967,354 B2 | 6/2011 | Faulkner et al. |
| 7,974,738 B2 | 7/2011 | Bruemmer et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,066 B2 | 9/2011 | Reverte et al. |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 2002/0029719 A1 | 3/2002 | Matsukawa |
| 2002/0037208 A1 | 3/2002 | Patrito |
| 2002/0076307 A1 | 6/2002 | Fallin et al. |
| 2003/0033217 A1 | 2/2003 | Cutlip |
| 2003/0051544 A1 | 3/2003 | Hong |
| 2003/0074125 A1 | 4/2003 | Walenty et al. |
| 2003/0200129 A1 | 10/2003 | Klaubauf et al. |

(56) References Cited

U.S. PATENT DOCUMENTS

| | | |
|---|---|---|
| 2004/0093116 A1 | 5/2004 | Mountz |
| 2004/0136821 A1 | 7/2004 | Berger et al. |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0166787 A1 | 8/2005 | Astrom |
| 2005/0212478 A1 | 9/2005 | Takenaka |
| 2005/0217532 A1 | 10/2005 | Conneally |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz et al. |
| 2006/0216137 A1 | 9/2006 | Sakata et al. |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0065258 A1 | 3/2007 | Benedict et al. |
| 2007/0071585 A1 | 3/2007 | Henkel |
| 2007/0177011 A1 | 8/2007 | Lewin et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2008/0001372 A1 | 1/2008 | Hoffman et al. |
| 2008/0065265 A1 | 3/2008 | Ozick et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0215180 A1 | 9/2008 | Kota |
| 2008/0275609 A1 | 11/2008 | Boydell |
| 2008/0281717 A1 | 11/2008 | Kortelainen |
| 2009/0074545 A1 | 3/2009 | Lert, Jr. et al. |
| 2009/0099879 A1 | 4/2009 | Ouimet |
| 2009/0114115 A1 | 5/2009 | Minges |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0265031 A1 | 10/2009 | Tachibana et al. |
| 2010/0044124 A1 | 2/2010 | Radke et al. |
| 2010/0044977 A1 | 2/2010 | Hughes et al. |
| 2010/0076591 A1 | 3/2010 | Lert, Jr. |
| 2010/0086385 A1 | 4/2010 | Shani |
| 2010/0102532 A1 | 4/2010 | Timoney et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0145507 A1 | 6/2010 | Blust et al. |
| 2010/0234995 A1 | 9/2010 | Zini et al. |
| 2010/0272546 A1 | 10/2010 | Wolkerstorfer |
| 2010/0286905 A1 | 11/2010 | Goncalves et al. |
| 2010/0316469 A1 | 12/2010 | Lert et al. |
| 2010/0324815 A1 | 12/2010 | Hiruta et al. |
| 2011/0008138 A1 | 1/2011 | Yamashita |
| 2011/0068943 A1 | 3/2011 | Lane, Jr. |
| 2011/0090064 A1 | 4/2011 | Dahms et al. |
| 2011/0106339 A1 | 5/2011 | Phillips et al. |
| 2011/0130974 A1 | 6/2011 | Yngve et al. |
| 2011/0176895 A1 | 7/2011 | Kortelainen |
| 2011/0185975 A1 | 8/2011 | van den Berg et al. |
| 2011/0202175 A1 | 8/2011 | Romanov et al. |
| 2011/0231016 A1 | 9/2011 | Goulding |
| 2011/0271469 A1 | 11/2011 | Ziegler et al. |
| 2012/0189409 A1 | 7/2012 | Toebes et al. |
| 2012/0277940 A1 | 11/2012 | Kumar et al. |
| 2012/0299260 A1 | 11/2012 | Goertzen et al. |
| 2013/0094926 A1 | 4/2013 | Olszak et al. |

FOREIGN PATENT DOCUMENTS

| | | |
|---|---|---|
| DE | 102011012950 | 9/2012 |
| EP | 0466004 | 1/1992 |
| EP | 0737630 | 10/1996 |
| EP | 1193195 | 4/2002 |
| EP | 1775240 | 4/2007 |
| EP | 2039580 | 3/2009 |
| FR | 2730715 | 8/1996 |
| JP | 08113321 | 5/1996 |
| JP | 2001344020 | 12/2001 |
| JP | 2002356207 | 12/2001 |
| JP | 2005138956 | 6/2005 |
| JP | 2008510673 | 4/2008 |
| JP | 4735387 | 7/2011 |
| WO | 8501493 | 4/1985 |
| WO | 9534491 | 12/1995 |
| WO | 0187648 | 11/2001 |
| WO | 2005009324 | 2/2005 |
| WO | 2008152245 | 12/2008 |
| WO | 2009106988 | 9/2009 |
| WO | 2010080539 | 7/2010 |
| WO | 2010118412 | 10/2010 |

* cited by examiner

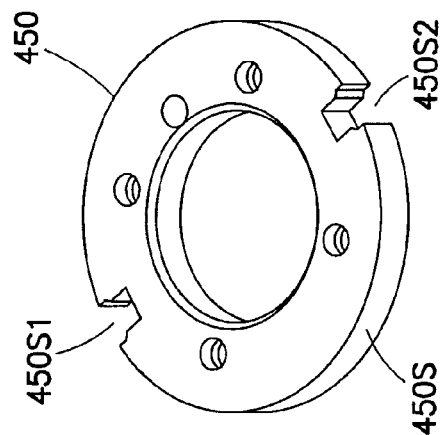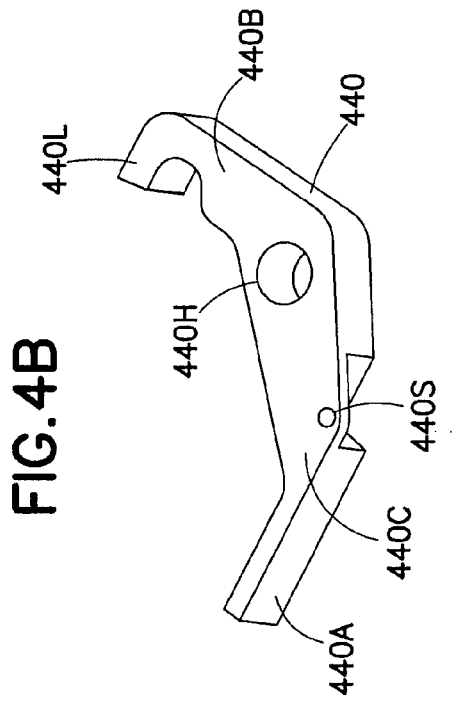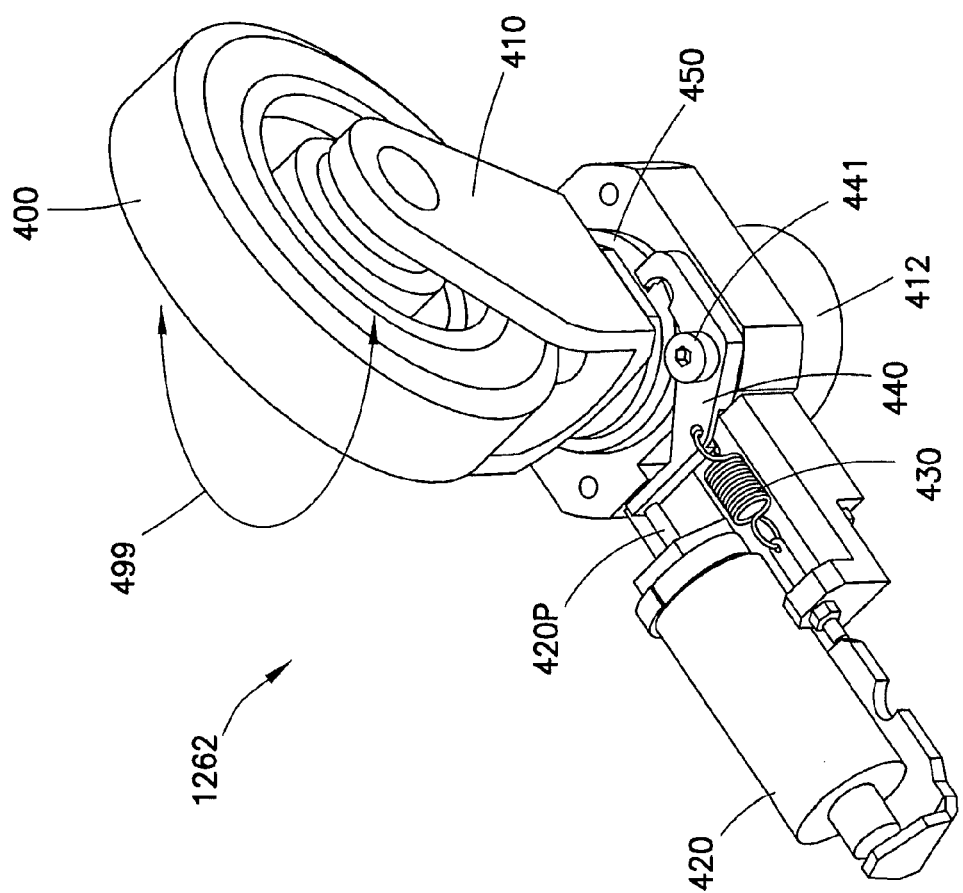

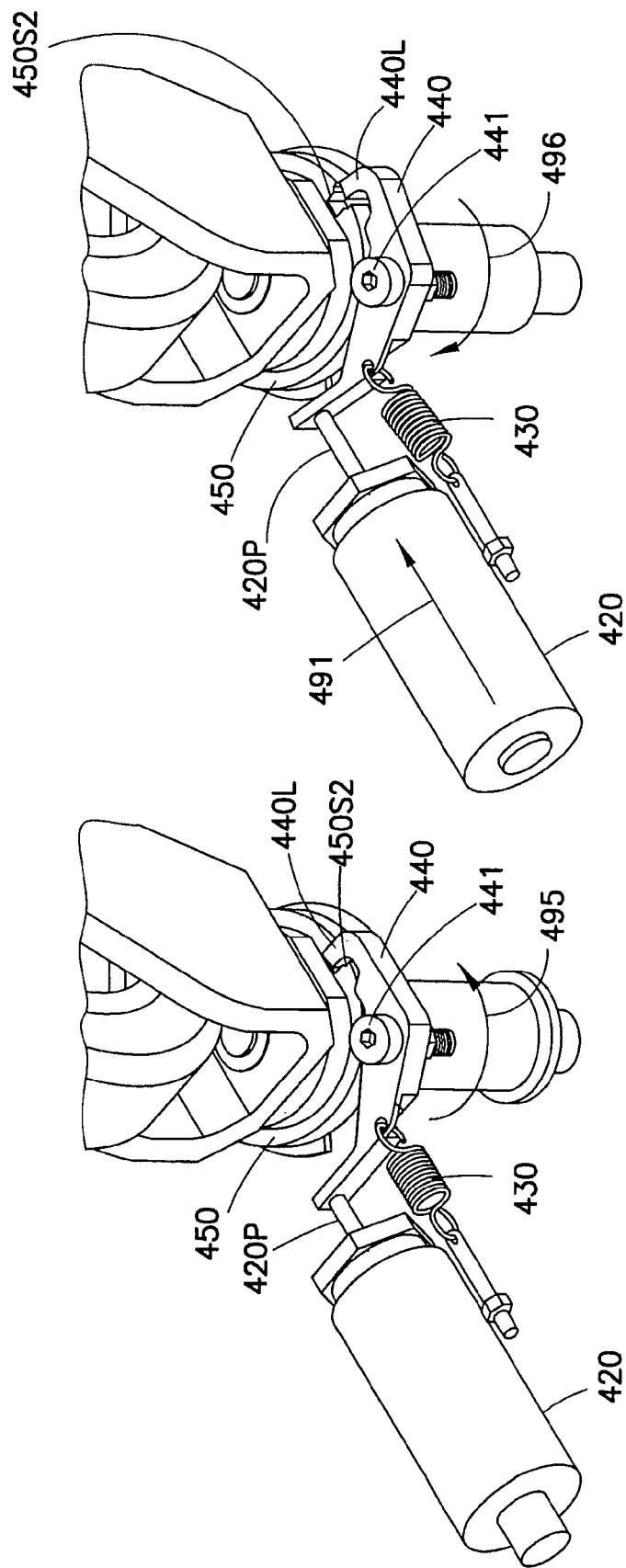

BOT HAVING HIGH SPEED STABILITY

CROSS-REFERENCE TO RELATED APPLICATIONS

This application is a continuation of U.S. patent application Ser. No. 13/326,447 filed on Dec. 15, 2011 and is a non-provisional of and claims the benefit of U.S. provisional patent application Ser. No. 61/423,359 filed on Dec. 15, 2010, the disclosures of which are incorporated by reference herein in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

When transporting the cases to and from the storage racks with automated transports it would be advantageous to be able to transport the cases at high speeds using autonomous transport vehicles.

BRIEF DESCRIPTION OF THE DRAWINGS

The foregoing aspects and other features of the disclosed embodiments are explained in the following description, taken in connection with the accompanying drawings, wherein:

FIGS. 4A-4E illustrate storage shelves and an exemplary autonomous transport vehicle in accordance with the embodiments;

FIGS. 6-8 are flow diagrams in accordance with aspects of the embodiments.

DETAILED DESCRIPTION OF THE EXEMPLARY EMBODIMENT(S)

Figure 1:
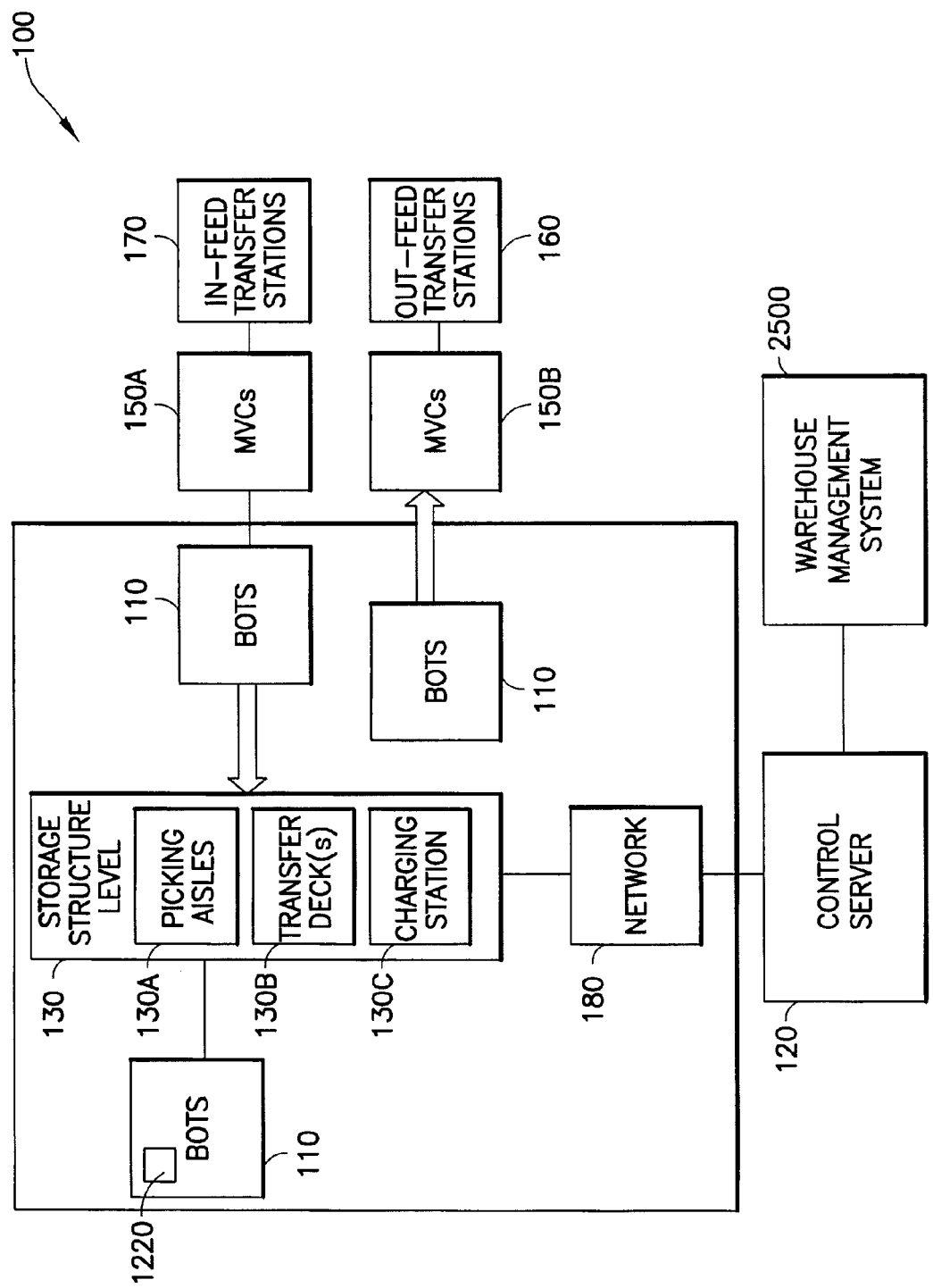
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, a storage structure 130, and a number of autonomous transport vehicles or robots 110 (referred to herein as "bots"). In the embodiments the storage and retrieval system may also include robot or bot transfer stations (as described in, for example, U.S. patent application Ser. No. 12/757,220, entitled "STORAGE AND RETRIEVAL SYSTEM," filed on Apr. 9, 2010, the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors 150 are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors 150 may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. Provisional Patent Application No. 61/423,298, entitled "MULTILEVEL VERTICAL CONVEYOR PLATFORM GUIDES" (-#1) and filed on Dec. 15, 2010, and U.S. patent application Ser. No. 12/757,354, entitled "LIFT INTERFACE FOR STORAGE AND RETRIEVAL SYSTEMS" and filed on Apr. 9, 2010 (the disclosures of which are incorporated by reference herein in their entireties) and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. In the embodiments transfer of case units between the bots 110 and the multilevel vertical conveyors may occur in any suitable manner through any suitable interface between the bots 110 and the conveyors.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector 110A (FIG. 3A) of the bot relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, U.S. Provisional Patent Application entitled "BOT PAYLOAD ALIGNMENT AND SENSING" (-#1) (Ser. No. 61/423,220) and filed on Dec. 15, 2010 (PAR) with U.S. Ser. No. 13/327,040 filed on Dec. 15, 2011), U.S. Provisional Patent Application entitled "AUTOMATED BOT WITH TRANSFER ARM" (-#1) (Ser. No. 61/423,365) and filed on Dec. 15, 2010 (PAR) with U.S. Ser. No. 13/326,952 filed on Dec. 15, 2011), and United States Provisional Patent Application entitled "AUTOMATED BOT TRANSFER ARM DRIVE SYSTEM" (-#1) (Ser. No. 61/423,388) and filed on Dec. 15, 2010 (PAR) with U.S. Ser. No. 13/326,993 filed on Dec. 15, 2011), the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. In the embodiments, each level may also include respective bot transfer stations for providing an indirect interface between the bots and the multilevel vertical conveyors. In this exemplary embodiment, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). In the embodiments the storage and retrieval system may also be configured so that each multilevel vertical conveyor serves a predetermined area of the array of storage spaces.

The storage structure 130 may also include charging stations 130C for replenishing, for example, a battery pack of the bots 110. The charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010, the disclosure of which is incorporated by reference herein in its entirety.

Figure 2:
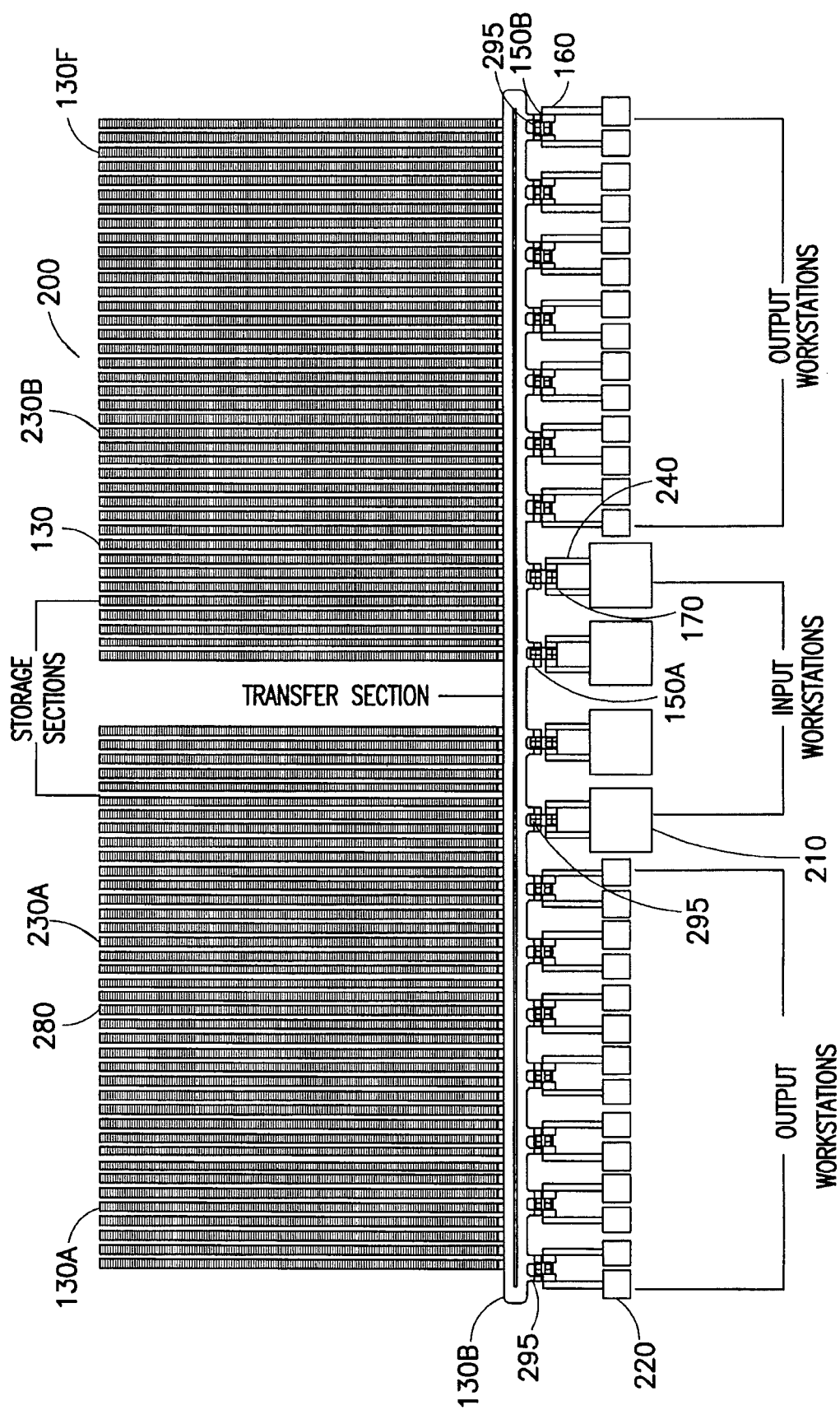
FIG. 2 illustrates a schematic plan view of an exemplary storage and retrieval system in accordance with the embodiments.

Referring also to FIG. 2, an exemplary configuration of the storage and retrieval system 100 is shown. Other suitable exemplary configurations of storage and retrieval systems can be found in, for example, U.S. patent application Ser. No. 12/757,381, entitled "STORAGE AND RETRIEVAL SYSTEM" and filed on Apr. 9, 2010, and United States Provisional Patent Application entitled "Warehousing Scalable Storage Structure" (-#1) (Ser. No. 61/423,340) and filed on Dec. 15, 2010 (PAR) with U.S. Ser. No. 13/326,674 filed on Dec. 15, 2011), the disclosures of which are incorporated by reference herein in their entireties. It should be understood that in the embodiments the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. In this example, the storage and retrieval system 200 includes transfer deck(s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B. The multilevel vertical conveyors 150A, 150B provide transport of case units into the storage and retrieval system 200 through input workstations 210 and provide output of case units from the storage and retrieval system 200 through output workstations 220. The storage and retrieval system 200 includes a first and second storage section 230A, 230B located side by side so that the picking aisles of each section are substantially parallel with each other and facing the same direction (e.g. towards transfer deck 130B). In the embodiments the storage and retrieval system may have any suitable number of storage sections arranged relative to each other in any suitable configuration.

Figure 3A:
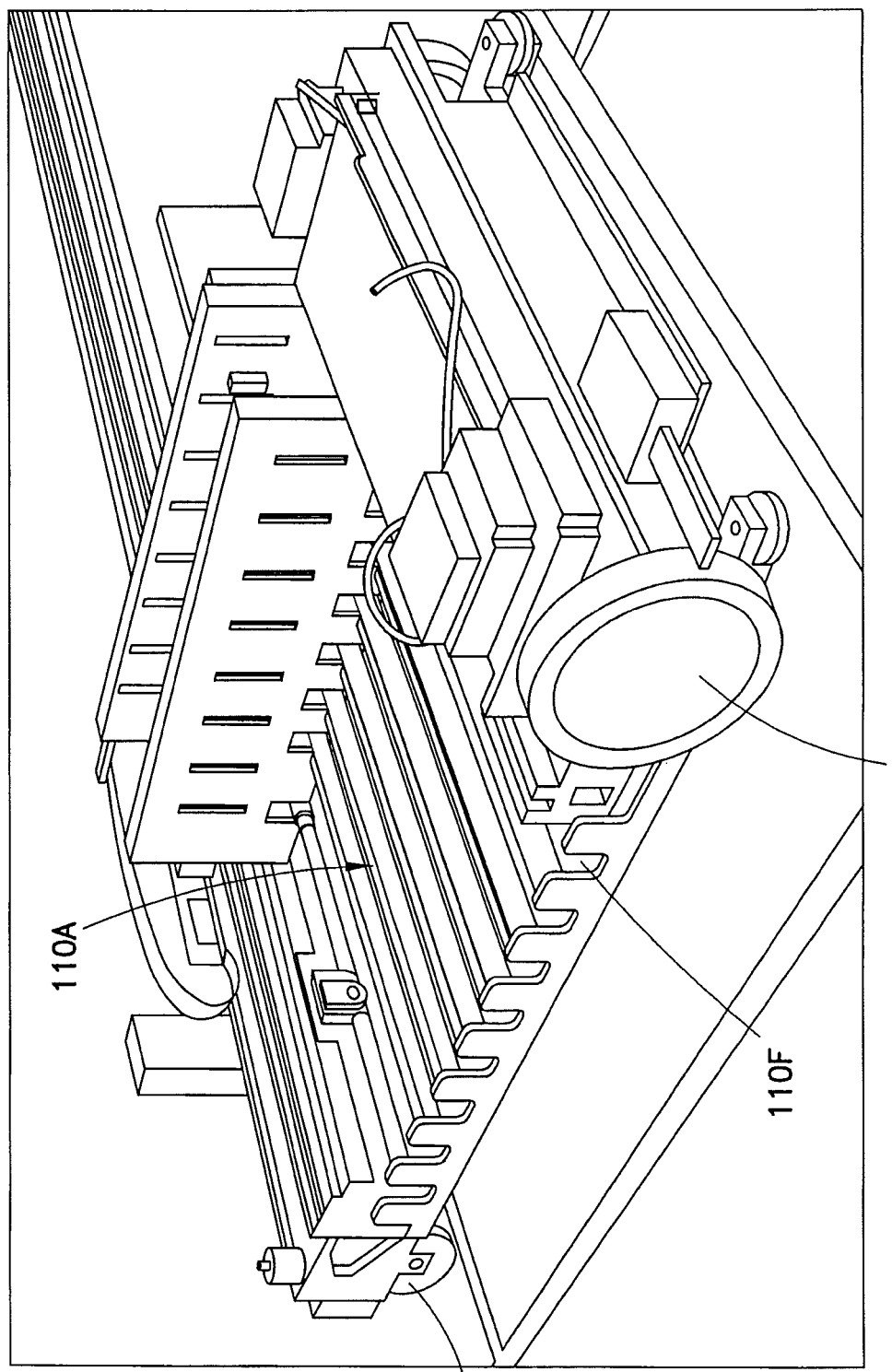
FIGS. 3A-3C illustrate schematic views of an exemplary autonomous transport vehicle in accordance with the embodiments.
Figure 3B:
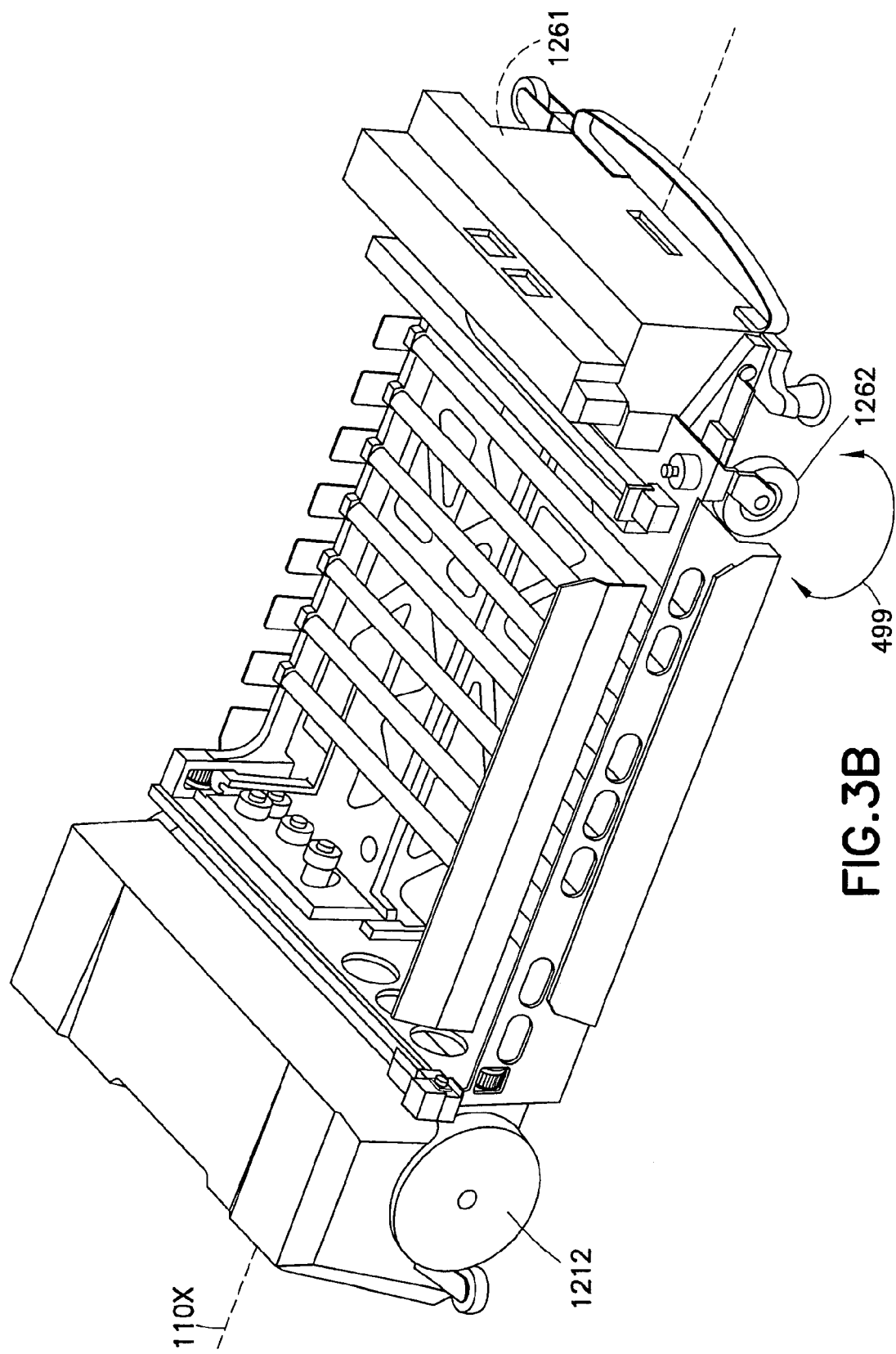
Figure 3C:
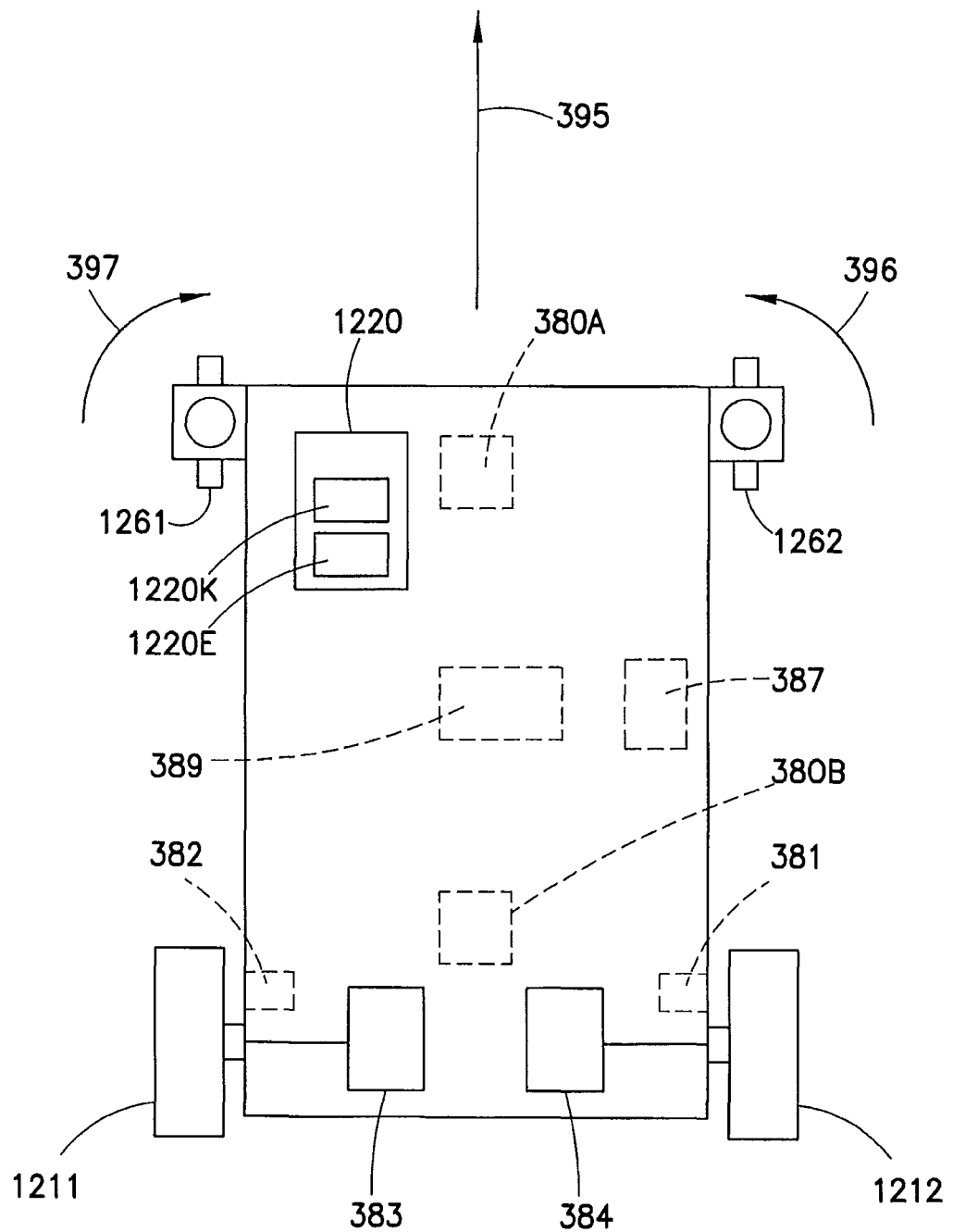

Referring to FIGS. 3A-3C, as described above, the bots 110 are configured to traverse the transfer deck(s) 130B and picking aisles 130A. The speed at which the bot 110 travels along the transfer deck(s) 130B may be higher than the speed at which the bot travels in the picking aisles. In the embodiments the bot 110 may travel at any suitable speeds within the travel decks and picking aisles. On the transfer decks 130B the bots 110 may be expected to travel at speeds up to about 10 m/s and higher speeds may be desired. The bot may travel along the transfer deck 130B in an unconstrained or unrestricted manner (e.g. substantially without mechanical guidance such as tracks, rails, etc.) while the bot 110 may be guided by, mechanical guide constraints such as tracks or rails during travel within the picking aisles 130A such as, for example, described in U.S. patent application Ser. No. 12/757,312, previously incorporated by reference. The bot may include any suitable sensors, such as one or more line following sensors 380A, 380B and one or more wheel encoders 381, 382, for providing feedback to, for example, bot controller 1220 for guiding the bot along one or more of the transfer deck(s) 130B and picking aisles 130A. In the embodiments the bot controller 1220 may be located on board the bot 110 and/or be located remotely from the bot 110 but in, for example, bi-directional communication with the bot 110. In one example the control server 120 may act at least in part as the remotely located bot controller.

The bot 110 may include at least two independently driven drive wheels 1211, 1212 and at least one swiveable (not steered, i.e., not provided with an independent steering input) wheel or caster 1262, 1261. In another aspect, the drive wheels 1211, 1212 may be driven by a common motor and a transmission that is capable of providing or generating differential torque in any suitable manner to the commonly driven wheels for a desired yaw input. It is noted that the casters 1261, 1262 and the drive wheel 1211, 1212 are disposed at substantially opposite longitudinal (e.g. front to back) ends of the bot 110 where a wheel is located substantially at each of the four corners of the bot. This caster wheel/drive wheel configuration may provide improved high speed stability for the bot and ease of control. Each drive wheel 1211, 1212 may have its own respective motor 383, 384 that is controlled by the bot controller 1220 in the manner described herein. As will be described in greater detail below, the casters 1262, 1261 may be selectively locked to allow stable travel of the bot 110 during, for example, substantially high speed bot travel along the transfer deck 130B. It is noted that during low speed travel the casters 1262, 1261 may be unlocked so that the bot 110 can enter, for example, picking aisles and/or multilevel vertical conveyor interface stations with either a front or a back of the bot 110 leading a direction of bot travel as described in, for example, U.S. Provisional Patent Application entitled "AUTONOMOUS TRANSPORT VEHICLE" (-#1) (Ser. No. 61/423,409) and filed on Dec. 15, 2010 (PAR) with U.S. Ser. No. 13/326,423 filed on Dec. 15, 2011), the disclosures of which are incorporated by reference herein in their entireties. Steering of the bot 110 along the transfer deck may be effected by applying a differential torque to the drive wheels 1211, 1212 through the respective independently controller motors 383, 384. The differential torque T may result in each of the drive wheels rotating at different speeds (e.g. rotations). The different rotational speeds of each wheel may cause the bot 110 to yaw or turn.

Figure 5:
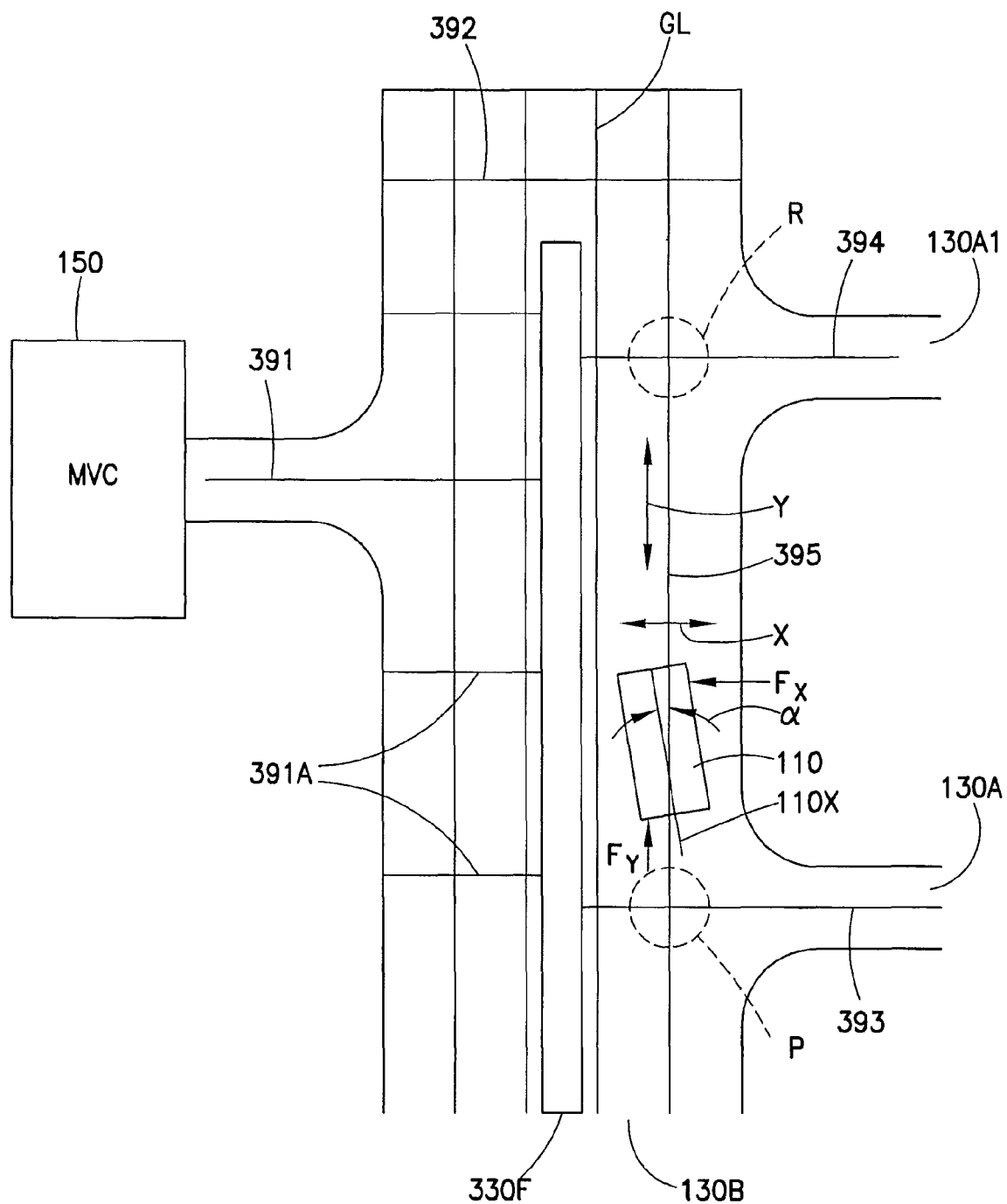
FIG. 5 is a schematic illustration of a portion of the storage and retrieval system in accordance with the embodiments.

As an example of bot travel along the transfer deck and referring to FIGS. 3C and 5, during straight line travel of the bot along, for example, guide line 395 (e.g. in 1 degree of freedom) both drive wheels 1211, 1212 rotate at substantially the same speed/angular velocity. If the travel direction of the bot has to be corrected for any suitable reason, one of the drive wheels 1211, 1212 may be slowed down to cause yawing of the bot. For example, if the bot 110 is to turn or yaw in the direction of arrow 396 the bot controller 1220 may cause drive wheel 1211 to rotate slower than drive wheel 1212 for turning the bot 110 in the direction of arrow 396. Likewise, if the bot 110 is to turn or yaw in the direction of arrow 397 the bot controller 1220 may cause drive wheel 1212 to rotate slower than drive wheel 1211 for turning the bot 110 in the direction of arrow 397. It is noted that the bot 110 is capable of bidirectional travel along guide line 395.

In the embodiments, as described above, the bot 110 may include one or more line following sensors 380A, 380B configured to detect one or more guidance lines 391-395 (which are inclusive of guide lines 391A which may be disposed on the transfer deck 130B at predetermined intervals in a direction transverse to the bot travel along the transfer deck may be provided as shown in FIG. 5) such as line 395 disposed on a surface of, for example, the transfer deck 130B for providing steering feedback to the bot controller 1220. It is noted that the one or more line following sensors 380A, 380B may be located at the front and rear of the bot 110 or the line following sensors may be located in any suitable location on the bot. The bot controller 1220 may be configured to receive signals generated by the one or more line following sensors 380A, 380B and or wheel encoders 381, 382 from which the controller 1220 determines suitable torque commands for driving the respective motors 383, 384 of drive wheels 1211, 1212.

The casters 1261, 1262 may be un-steered as noted before, but may have a directional or swivel lock configured to aid in steering and control of the bot 110. It is noted that during substantially straight line travel of the bot on the transfer deck 130B the casters 1261, 1262 may be locked (e.g. the plane of rotation of the caster wheel 400 is substantially aligned with a 1 degree of freedom axis 110X of the bot where the 1 degree of freedom axis 110X may coincide with the bot's straight line direction of travel) unless the degree at which the bot 110 is to turn (e.g. to account for corrections to the direction of travel) exceeds a predetermined amount (e.g. a predetermined turn angle for correcting tracking of the substantially straight line travel of the bot) or if the bot travel speed is below a predetermined amount. The casters may also be unlocked to provide the bot with steering that is more responsive than when the casters are locked so that quicker corrections to the bot's direction of travel can be made. It is noted that, as shown in FIG. 5, the positioning of the casters 1261, 1262 at an end of the bot 100 that is opposite the drive wheels 1211, 1212 operates to amplify the slip angle or amount of lateral movement at, e.g. a front of the bot where the casters are located. The slip angle or amount of lateral movement may be generated from the differential rotation at the drive wheels 1211, 1212. The slip angles will generally be small, and thus can be generated by correspondingly smaller differential rotation at the drive wheels which minimizes slipping of the drive wheels (which is undesirable). The slipping of the caster wheels may occur when the swivel lock of the casters is locked and a differential torque is applied to the drive wheels such that the caster wheels are "slid" in a direction substantially transverse to a plane of rotation of the caster wheel as it travels along, e.g., the transfer deck 130B. During the slipping of the caster wheel it is noted that the caster wheel may slow its rotation or substantially stop rotating.

Still referring to FIGS. 3A-3C and 5 as a non-limiting example only, the bot may travel on the transfer deck 130B along line 395 where the bot is to turn down picking aisle 130A1 in a manner substantially similar to that described in U.S. patent application Ser. No. 12/757,312 (previously incorporated by reference herein). The casters 1261, 1262 may be locked to allow for stable high speed bot travel until the bot makes or is about to make the turn onto the picking aisle 130A1. For example, as the bot slows below a predetermined travel speed, the casters 1261, 1262 may unlock allowing the caster wheels to swivel (e.g. giving the bot 2-degrees of freedom of movement). The bot controller 1220 may also determine that the bot is to make a turn (such as the substantially 90-degree turn into picking aisle 130A1) where the angle of the turn exceeds a predetermined turn angle. The casters 1261, 1262 may unlock upon the determination that the turn angle exceeds the predetermined turn angle for correcting tracking of the substantially straight line travel of the bot. The bot controller 1220 may also account for turn angle and bot speed when determining when to unlock the casters 1261, 1262. The controller 1220 may also be configured to cause the unlocking of the casters 1262, 1261 at substantially the same time that a differential torque is applied to the drive wheels 1211, 1212.

Referring now to FIGS. 4A-4E the swiveling caster wheels 1261, 1262 having the selectively lockable swivel lock will be described. It is noted that while the casters are described with respect to caster 1262, caster 1261 is substantially similar. In accordance with the embodiments, the caster 1262 includes a frame 412, a wheel yoke 410, a wheel 400, a first locking member 440, a second locking member 450, an actuator 420 and a spring 430. It is noted that the caster may have any suitable components arranged in any suitable manner. In this example, the wheel 400 is rotatably mounted to the yoke 410 in any suitable manner. The second locking member 450 may be fixedly mounted to the yoke 450 so that the second locking member 450 and yoke 410 form an integral unit. In the embodiments the second locking member may be integrally formed with the yoke 410 in a unitary construction. The yoke 410 (and the second locking member 450 mounted thereto) may be pivotally mounted to the frame 412 so that the yoke assembly (e.g. including the second locking member 450, the yoke 410 and the wheel 400) can be freely rotated 360-degrees in the direction of arrow 499 (see also FIG. 3B). It is noted that the axis of rotation of the yoke assembly is substantially perpendicular to a surface on which the bot 110 travels, such as, for example, the surface of the transfer deck 130B. The first locking member 440 may be pivotally mounted to the frame 412 by, for example, any suitable pivot 441 having a pivot axis that is substantially parallel with a swivel axis of the yoke 450 (and wheel 400). The pivot 441 may be for example, a shoulder bolt or any other suitable axle and/or retaining device. A spring 430 or any other suitable resilient member may be mounted between the frame 430 and a portion of the first locking member 440 so as to bias the first locking member 440 about the pivot 441 as will be described in greater detail below. The actuator 420 may also be mounted to the frame 412 for engaging a portion of the first locking member 440 in an opposing relation to the spring 430. The actuator 420 may be any suitable actuator, such as a solenoid, suitably connected to, for example, the bot controller 1220 where the controller is configured to cause actuation of the actuator 420. In one aspect the actuator 420 may be horizontally oriented (e.g. arranged to extend and retract horizontally) but in other aspects the actuator may have any suitable orientation. The swivel lock of the casters 1262, 1261 may be configured for rapid lock and release through, for example, a pulse actuation of the actuator 420 (e.g. electrical current is sent to the actuator for a predetermined amount of time so that the actuator is activated only for a limited time so that a piston 420P of the actuator is retracted for releasing the swivel lock of the caster and extended for locking the swivel lock of the caster in succession). In one example, the pulse actuation of the actuator 420 may activate the actuator for approximately one or two seconds for unlocking the swivel lock of the casters. In other examples the pulse actuation of the actuator may activate the actuator for less than about one second. In still other examples, the pulse actuation of the actuator may activate the actuator for more than about two seconds or any other suitable amount of time. The actuator may also be configured so that the caster is released when the piston 420P is extended and locked when the piston 420P is retracted. As may be realized, in one example, any suitable sensors may be provided and be in communication with the controller 1220 for sensing when each of the swivel locks for the casters is locked and/or unlocked. In other examples, sensors may not be provided for sensing when the casters are locked and/or unlocked.

In this exemplary embodiment the first locking member or lock bar/link 440 may have a substantially dog-leg or hooked shape. In alternate embodiments the first locking member 440 may have any suitable shape. The first locking member 440 may have a pivot hole 440H configured to accept the pivot 441 for allowing the first locking member to pivot about the pivot pin 441. A first portion 440B of the first locking member 440 may extend in a first direction from the pivot hole 440H while a second portion 440C of the first locking member 440 extends in a second direction from the pivot hole 440H. The first direction and second direction may be angled relative to one another by any suitable angle (e.g. from 0 to 360 degrees). In this example, the first portion 440B includes a protrusion or other locking feature 440L configured to engage a reciprocally shaped engagement feature 450S1, 450S2 of the second locking member 450. The second portion 440C may include an attachment feature 440S for attaching the spring 430 to the first locking member 440. The second portion 440C may also include an actuator engagement surface 440A. In this example, the ratio between the lengths of the first and second portions 440B, 440C of the first locking member may be such that forces applied to the second portion 440C cause the precise movement of the first portion 440B for releasing locking feature 440L from the second locking member 450. For example, the lever action of the first locking member 440 converts the stroke of the actuator 420 to a short engagement stroke of the protrusion 440L into and out of the one or more engagement features 450S1, 450S2 that may result in substantial on/off control of the swivel lock to reliably engage and disengage the swivel lock while the bot is travelling at speed (e.g. about 10 m/s or more) and/or while the bot is travelling at any suitable speed.

In the embodiments the second locking member 450 is in the form of a disc but the second locking member may have any suitable configuration. The second locking member may include one or more engagement features or slots 450S1, 450S2 or other retaining feature configured to accept and reciprocally engage the protrusion 440L of the first locking member 440 or the second locking member may include a protrusion for engaging a reciprocally engagement feature or recess in the first locking member. In the embodiments, the second locking member may include two slots arranged so that the caster wheel 400 can be locked at about 0-degrees and about 180-degrees where the about 0 and 180-degree positions are arranged so that when locked the rotational plane of the wheel 400 is substantially aligned with a 1-degree of freedom axis 110X of the bot (which may coincide with the direction of straight line travel of the bot 110). In the embodiments the second locking member may have any suitable number of locking features arranged in any suitable manner for locking the wheel at any angle(s).

In operation, to lock swivel lock of the caster 1262 the actuator may be retracted (e.g. a piston 420P or other suitable engagement feature of the actuator may be retracted) so that it is not in substantial contact with the actuator engagement surface 440A of the first locking member 440. The spring 430 may be configured to pull or otherwise bias the first locking member to rotate about pivot 441 in the direction of arrow 495 so that the locking feature 440L is substantially forced against a side surface 450S of the second locking member 450. As the yoke assembly rotates in the direction of arrow 499 and the biased locking feature 440L rides along the side surface 450S the force exerted by the spring 430 causes the locking feature 440L to be inserted into one of the slots 450S1, 450S2 for substantially preventing further rotation of the yoke assembly such that the yoke assembly of the caster is in a locked configuration (e.g. is locked from rotation). As noted above, the slots 450S1, 450S2 may be positioned so that when the locking feature 440L is inserted into one of the slots 450S1, 450S2 the rotational plane of the wheel 499 is substantially aligned with the 1 degree of freedom axis 110X of the bot. As such, one of the slots 450S1, 450S2 will be aligned with the locking feature 440L by virtue of the bot travelling along a substantially straight line path to facilitate the locking of the caster 1262.

To unlock the swivel lock of the caster, the actuator 420 is actuated (e.g. the piston 420P or other engagement feature is extended in the direction of arrow 491) to engage the actuator engagement surface 440A of the first locking member 440. As described above, the actuation of the actuator 420 may be a pulse actuation (e.g. electrical current is sent to the actuator for a predetermined amount of time so that the actuator is activated only for a limited time so that a piston 420P of the actuator is retracted for releasing the swivel lock of the caster and extended for locking the swivel lock of the caster in succession). The force exerted by the actuator 420 on the first locking member 440 opposingly overcomes the force of the spring 430 causing the first locking member 440 to rotate about pivot 441 in the direction of arrow 496 such that the locking feature 440L disengages the slot 450S1, 450S2 for unlocking the swivel lock of the caster 1262. As a differential torque T is applied to the drive wheels the caster wheels 1262, 1261 want to rotate according to the way the bot 110 is turning. The disengagement or release of the locking member 440L from the slot 450S1, 450S2 allows the wheel 400 (e.g. through a rotation of the components of the yoke assembly) to freely rotate or swivel in the direction of arrow 499 by virtue of the differential torque applied to the drive wheels 1211, 1212. It is noted that the actuator is activated for a time period that is long enough for the slot 450S1, 450S2 to become misaligned with the locking feature 440L after which time the spring 430 causes the locking feature 440L to ride along the side 450S as described above to allow for unlocking and locking of the caster 1262, 1261 as described above.

As can be seen in e.g. FIGS. 4A-4E, the configuration of the first locking member 440 is such that locking engagement between the first and second locking members 440, 450 occurs substantially laterally relative to the longitudinal axis or 1-degree of freedom axis of the bot 110 for increased rigidity (e.g. creating a greater moment arm for resisting rotation of the yoke assembly). However, the first locking member (and second locking member) may have any suitable configuration and spatial relationship with each other and the 1-degree of freedom axis of the bot for rigidly preventing rotation of the caster 1262, 1261. In the embodiments, a caster drive motor may be coupled to, for example, the yoke assembly, for providing steerable rotational movement of the caster 1262, 1261. It is noted that the coupling between the caster drive motor and the yoke assembly may be any suitable coupling including substantially rigid links, belts/pulleys, gear trains and any other suitable drive couplings.

Referring again to FIG. 3C and as described above, the bot 110 may include one or more wheel encoders 381, 382 configured to sense rotational movement of each of the drive wheels 1211, 1212. The wheel encoders 281, 282 may be any suitable encoders such as, for example, incremental encoders. In the embodiments the encoders may also be absolute encoders. In this example, the encoders 381, 382 provide data to, for example, the bot controller 1220 for determining a location of the bot 110 within the storage and retrieval system 100. An example of determining the location of the bot 110 within the storage and retrieval system 100 using encoders can be found in U.S. Provisional Patent Application entitled "BOT POSITION SENSING" (-#1) (Ser. No. 61/423,206) and filed on Dec. 15, 2010 (PAR) with U.S. Ser. No. 13/327,035 filed on Dec. 15, 2011), the disclosures of which are incorporated by reference herein in their entireties. The encoders 381, 382 on each of the drive wheels may also provide information for determining a state (e.g. acceleration, speed, direction, etc.) of the bot 110 as will be described below. However, the drive wheels 1211, 1212 may be subject to wheel slipping that adversely affects the confidence of the data received from the encoders 381, 382. Wheel slipping may be caused by, for example, a loss of traction. This loss of traction may be caused by, for example, a reduction in friction between each of the drive wheels 1211, 1212 and the drive surface of, for example, the transfer deck 130B or picking aisle 130A or one of the drive wheels 1211, 1212 lifting off of the drive surface of the transfer deck 130B or picking aisle 130A. Where the bot drive wheels 1211, 1212 lose traction the wheel position measured by the respective encoders 381, 382 will no longer reflect the actual bot 110 position. For example, if the bot 110 is accelerating then the wheel will tend to rotate faster than the bot is travelling. Conversely, if the bot is decelerating then the slipping wheel will tend to rotate slower than the bot is travelling.

In accordance with the embodiments, the bot controller 1220, or any other suitable controller of the storage and retrieval system (e.g. control server 120) may be configured to account for wheel slip by, for example, using the data from the encoder 381, 382 from the drive wheel 1211, 1212 that is not slipping. In one example, the controller 1220 may be configured to determine which drive wheel 1211, 1212 is slipping based on the torque being applied to the drive wheels 1211, 1212 by their respective drive motors 383, 384. As a non-limiting example, if a positive torque is being applied then a slipping wheel will accelerate in a positive manner so the encoder from the wheel with a lower velocity and/or rotational speed will be used to estimate the speed and position of the bot 110 within the storage and retrieval system 100. If a negative torque is being applied to the drive wheels 1211, 1212 then a slipping wheel will accelerate in a negative manner (e.g. decelerate) so the encoder from the drive wheel 1211, 1212 with a higher rotational velocity and/or rotation speed will be used to estimate the speed and position of the bot 110 within the storage and retrieval system 100. In the embodiments, one or more encoders may be placed on idler wheels (e.g. wheels that are not driven) such as the casters 1261, 1262 such that the controller can estimate the position and speed of the bot 110 based on the rotation of the non-driven wheels.

In the embodiments, the controller 1220 may be configured with predetermined drive wheel 1211, 1212 velocities or rotational speeds for any predetermined time of bot operation. The controller 1220 when determining the position and speed of the bot 110 when, for example, one wheel is slipping may compare the actual velocities and/or rotational speeds of the drive wheels 1211, 1212 with the expected or predetermined velocities and/or rotational speeds for each drive wheel 1211, 1212. In one example, the controller 1220 may be configured to perform inertia modeling to determine how much velocity/rotation speed change to expect due to, for example, acceleration of the bot 110 (and its drive wheels). If the velocities/rotational speeds of one or more of the drive wheels 1211, 1212 does not substantially match the expected or predetermined velocities/rotational speeds the encoder data from the one or more of the drive wheels 1211, 1212 whose data does not substantially match may be ignored and replaced with the expected or predetermined data when determining the bot's 100 position and speed.

Figure 6:
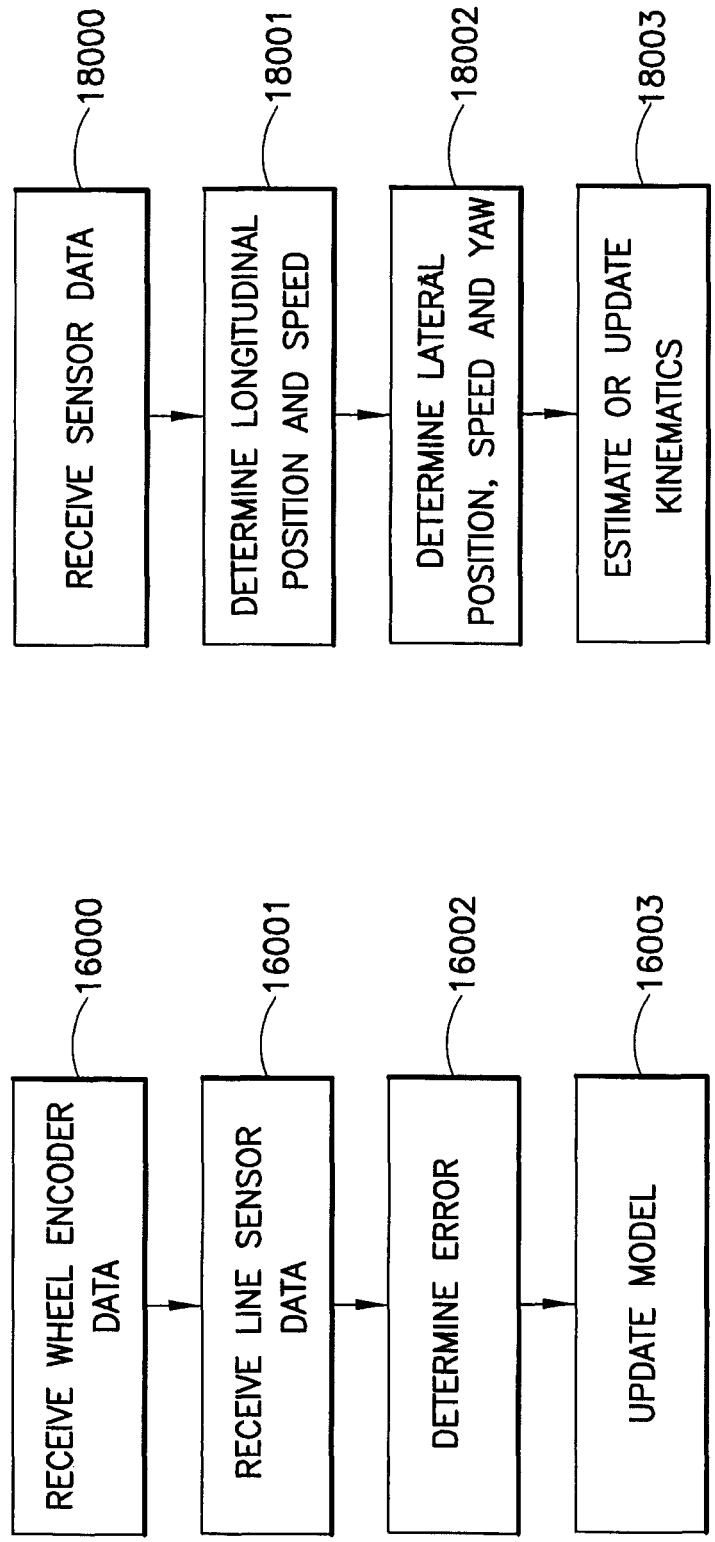

It is noted that the determination of the bot's speed and position may be performed with, for example, models that both utilize and do not utilize suitable filters. In the embodiments the controller 1220 may be configured to filter the spurious data from the drive wheel encoders 381, 382 when determining bot 110 location/speed and state estimations. As an example, the controller 1220 may include, for example, a Kalman (or other suitable) filter to substantially eliminate the effects of wheel slip error in bot state estimation and location calculations. In one aspect the controller 1220 may include an extended Kalman filter 1220K that may be employed using substantially real time encoder updates (for example, at 2 kHz, every 0.5 milliseconds, every 50 milliseconds, or any other suitable frequency or time increments), along with any suitable time data regarding each sensor transition event (e.g. such as when a sensor detects a suitable guide line, see FIG. 5 on the transfer deck 130B). Referring to FIG. 6 a bot position determination method employing an extended Kalman filter is depicted. In general, calculating a bot 110 position may be performed using an extended Kalman filter by applying data received from any suitable encoder (FIG. 6, Block 16000), such as one or more of encoders 381, 382, to determine the bot 110 position and/or predict sensor 380A, 380B transitions. However, as a variation to the general method depicted in FIG. 6, the bot position finding Kalman model may be updated periodically. More specifically, sensor data may be received at each sensor 380A, 380B transition over a suitable guide line, such as guide lines 391-394 (as may be realized, additional guide lines 391A that are disposed on the transfer deck 130B at predetermined intervals in a direction transverse to the bot travel along the transfer deck may be provided as shown in FIG. 5), that includes a time of the transition and as appropriate, an identity and/or location of the guide line (FIG. 6, Block 16001). Based upon the data from sensors 380A, 380B, an error may be calculated between an expected transition time for the location and the measured transition time (FIG. 6, Block 16002). This error may then be employed to update the extended Kalman filter for more accurate subsequent estimations of bot positioning as determined by the wheel encoders 381, 382 (FIG. 6, Block 16003). In general, one or more of the wheel encoder and line sensor data is employed to provide bot positioning data for control of the bot 110, while actual detected guide line transitions may be employed to update the pot positioning model, for example, the equations of an extended Kalman filter.

By way of example, for bot positioned at a particular position (Xe, Ye) on, for example the transfer deck 130B, and travelling at an estimated velocity and acceleration V, a, the model might predict a guide line being sensed or transitioned by one of the line sensors 380A, 380B at time $t_e$, and the system may identify the actual transition of the guide line at time $t_s$. The encoder 381, 382 time $t_s$ (or optionally at the time stamp) may generate an error expressed as:

$$\delta \equiv t_s - t_e \text{ or } \underline{\delta} \equiv \begin{bmatrix} t \\ x \\ y \end{bmatrix}_s - \begin{bmatrix} t \\ x \\ y \end{bmatrix}_e$$

Then, extended Kalman filter equations may be used as described for example, in Applied Optimal Estimation by Arthur Gelb (MIT Press 1794). An adaptation of the formulation described in Gelb may be briefly stated as a system model:

$$\dot{x}(t)=f(x(t),t)+w(t); w(t) \approx N(0,Q(t))$$

and a measurement model:

$$z_k=h_k(x(t_k))+v_k; l=1, 2, \ldots v_k \approx N(0,R_k)$$

with state estimate propagation:

$$\dot{\hat{x}}(t)=f(\hat{x}(t),t)$$

and error covariance propagation:

$$\dot{P}(t)=F(\hat{x}(T),T)P(t)F^T(\hat{x}(t),t)+Q(t)$$

As a significant advantage, this generalized technique permits use of individual sensor events incrementally, rather than requiring some number of sensor event to identify the location of the bot 110. It should be understood that, while a particular order of steps is implied in FIG. 6, that the depicted operations are repetitively performed during operation of the bot 110, and that no particular order or timing of steps should be inferred. Nonetheless, it will be generally true in some implementations that encoder data from wheel encoders 381, 382 may be provided substantially continuously in real time, while line sensor 380A, 380B transitions of guide lines 391-394 (and 391A) may occur intermittently as the bot traverses, for example the transfer deck 130B. It should also be understood that, while an extended Kalman filter is one useful technique for converting encoder data into bot position information, other filters or linear modeling techniques may similarly be applied.

The data from the encoders 381, 382 may be further weighted based on signals from the one or more line following sensors 380A, 380B that provide signals to the controller 1220 corresponding to deviation of the bot from a guide line GL (FIG. 5) on, for example, the transfer deck 130B. For example, when one of the drive wheels 1211, 1212 slips a differential torque results between the drive wheels 1211, 1212 which causes the bot 110 to turn and deviate from the guide line GL.

Figure 7:
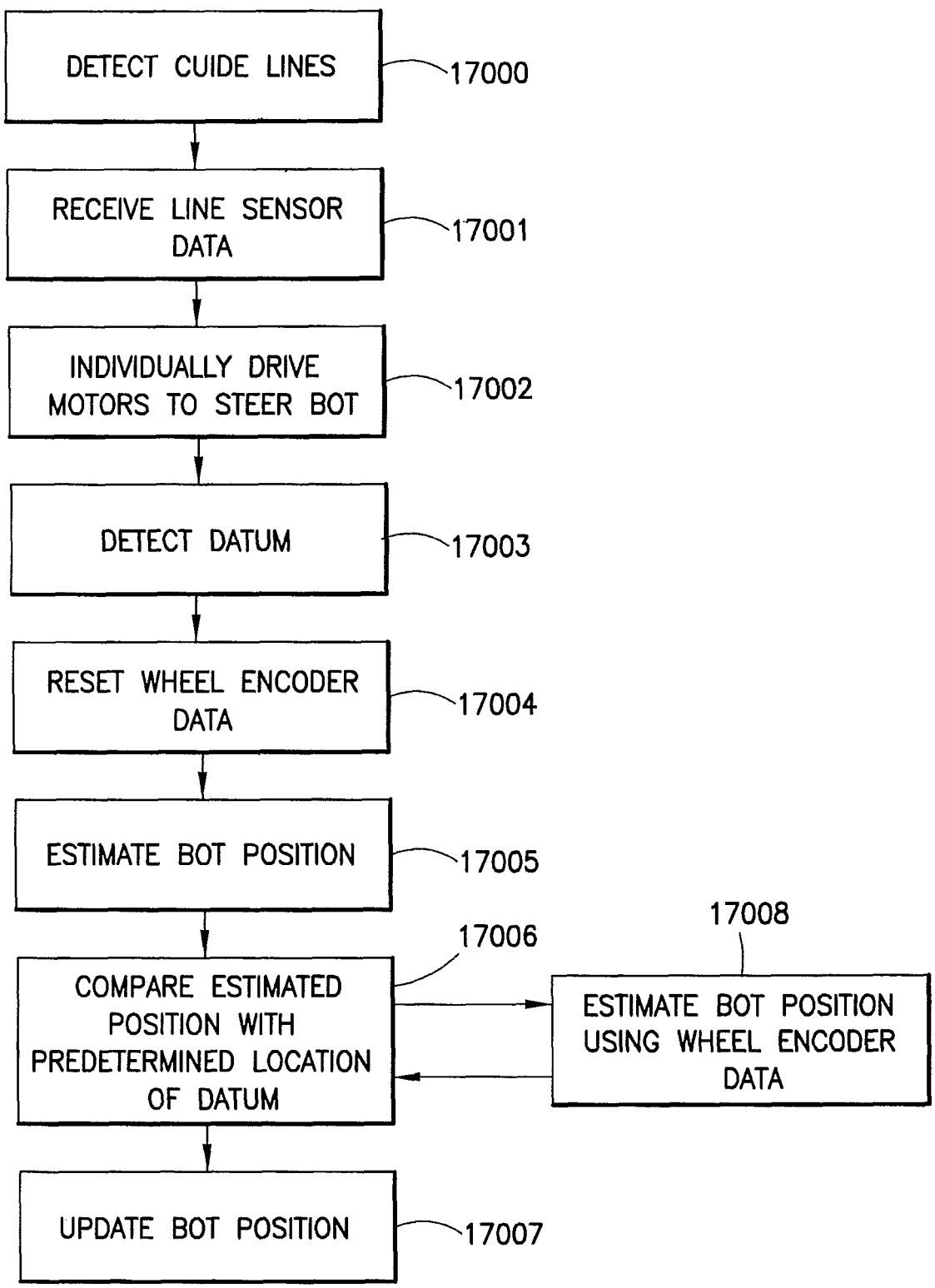

The bot controller 1220 may also be configured to determine a position of the bot using, for example, the wheel encoders 381, 382 in combination with other position tracking features of the storage and retrieval system. In the embodiments, when in the picking aisles 130A the wheel encoders 381, 382 may be used in combination with slat counting (e.g. tracking the position of the bot relative to slats on the storage shelves with one or more slat detection sensors 387) as described in U.S. Provisional Patent Application No. 61/423,206 entitled "BOT POSITION SENSING" (-#1), previously incorporated by reference herein. In the embodiments, when travelling on the transfer deck 130B the controller 1220 may be configured to use the wheel encoders 381, 382 in combination with a tracking of the guide lines 391-395 on the floor (e.g. driving surface) of the transfer deck 130B. Referring to FIGS. 3C and 5 when travelling on the transfer deck 130B the one or more line following sensors 380A, 380B of the bot detect guide lines 391-395 (FIG. 7, Block 17000). The controller 1220 receives signals from the one or more line following sensors 380A, 380B (FIG. 7, Block 17001) and drives the individual drive motors 383, 384 accordingly (e.g. by adjusting the torque applied to each respective wheel for steering the bot as described above) for keeping the bot travelling along a desired one of the guide lines 391-395 (FIG. 7, Block 17002). As can be seen in FIG. 5, each guide line GL running around the transfer deck 130B is crossed by, for example, transverse guide lines, such as guide line 392 located at turns on the transfer deck as well as guide lines 391, 393, 394 located at the picking aisle 130A locations. The crossing locations R, P of each of these guide lines 391-395 may be at known predetermined locations which are stored in any suitable memory accessible by the bot 110 such as for example, a memory of the bot 110 or the control server 120. Where the crossing locations R, P are stored remotely from the bot 110, such as in a memory of the control server, the bot 110 may be configured to access the crossing location information in any suitable manner such that the information is downloaded to the bot 110 or remotely read by the bot 110.

In one exemplary operation of bot travel, it is noted that verification or position qualification of the bot 110 on, for example, the transfer deck 130B may be determined from the crossing locations/position datum lines R, P on the transfer deck 130B (FIG. 7, Block 17003) in a manner substantially similar to that described in U.S. patent application Ser. No. 12/757,312 (previously incorporated by reference herein). For example, as the bot 110 travels along, for example, guide line 395 the bot passes the crossing location P and may verify its location using the predetermined location of the crossing location P. At this point the data from the wheel encoders may be reset (FIG. 7, Block 17004) so that the encoders incrementally track, for example, a distance traveled by the bot 110 starting from crossing location P (which was previously verified) so that, for example, the controller 1220 can estimate the bot position relative to a last known verified position of the bot (FIG. 7, L. 17005). It is noted that resetting the wheel encoder data may substantially eliminate any tolerance and/or error stack ups generated by the wheel encoders. As the bot 110 continues to travel along the guide line 395 the bot 110 detects a second crossing location R. At substantially the time the second crossing location R is detected by the bot 110 the controller 1220 uses an estimated location of the bot 110 as determined from the wheel encoders 381, 382 and the last verified location of the bot (which in this example is at crossing location P) and compares the estimated location of the bot with the predetermined location of the crossing location R (FIG. 7, Block 17006). If the estimated location of the bot substantially matches the predetermined location of the crossing location R then the controller verifies or otherwise qualifies the position of the bot 110 and updates the bots 110 location accordingly (FIG. 7, Block 17007). The controller 1220 may also be configured to verify or otherwise qualify the bot's location in any suitable manner such as, for example, through the use of an extended Kalman filter as described above. As may be realized during the determination of the bot's position/location using the wheel encoders 381, 382 and line following the controller 1220 may be configured to account for wheel slip in the manner described above. If the estimated position does not match the predetermined location of the crossing location R the signal generated by the one or more line following sensors 380A, 380B corresponding to guide line 394 (at location R) may be ignored such that the location of the bot is estimated using the wheel encoders 381, 382 (FIG. 7, Block 17008) until a next crossing location can be verified or otherwise qualified with the bot's estimated location (FIG. 7, Blocks 17006, 17007). In the embodiments, if the estimated location of the bot 110 and the predetermined crossing location do not match the bot 110 may also be configured to verify its position in any suitable manner such as, for example, returning to a last known location and resetting the encoder information.

Referring to FIGS. 3C and 5, the bot controller 1220 (or other suitable controller configured to control the bot, such as a remote controller as described above) may be configured with a state estimator module 1220E for estimating, for example, the kinematic state of the bot (e.g. position X, Y; position rates or speed $\dot{x}$, $\dot{y}$, and/or yaw angle α all with respect to time t) to determine command logic for controlling the bot rather than controlling the bot directly from sensor input. For example, using the state estimator module 1220E the bot 110 can determine, based on one or more sensor inputs, how fast it is travelling, what direction it is travelling, etc. and then determine what bot parameters need to be changed in order to arrive at a new desired speed, direction, etc. rather than, using bot speed as an example, reduce the torque on the drive wheels and use the wheel encoders as a gauge for stopping the reduction in motor torque when the encoders send signals corresponding to the desired new speed.

In one example, the command logic may allow, for example, the controller 1220 to know the speed, acceleration, and direction of the bot and calculate corrective control commands to, for example, the drive motors 383, 384 for maintaining a predetermined directional course and speed. For convention purposes, the Y (e.g. longitudinal) position of the bot is in a direction substantially parallel with a predetermined datum line or line of travel (in this example e.g. line 395) and may be an estimation of bot position between, for example, line crossing locations R, P or any other suitable lateral datum lines. The X (lateral) position of the bot is in a direction substantially transverse to the predetermined datum line 391-395 and may be an estimation of the amount of offset between, for example, the 1 degree of freedom axis 110X of the bot and the predetermined datum line 391-395. The yaw angle α (e.g. the divergence/convergence angle with the predetermined datum line) may be an estimation of the angle between the 1 degree of freedom axis 110X of the bot and the predetermined datum line 391-395. The state estimator module 1220E of the controller 1220 may also be configured to determine or otherwise estimate dynamic states and commands such as, for example, forces Fx, Fy exerted on the bot, the differential torque T applied by the drive motors 383, 384, a position rate or speed of the bot (e.g. linear or angular/yaw speeds) and/or changes in the position rate (e.g. acceleration) of the bot 110.

In addition to the wheel encoders 381, 382 and line following sensors 380A, 380B described above, the bot 110 may or may not also include any suitable inertial sensor 389, such as a 1 or 2 dimensional accelerometer. The controller may be configured to use signals from the inertial sensor 389 in combination with, for example, wheel odometry information from the wheel encoders 381, 382 and the line following sensors 380A, 380B for estimating the state of the bot 110.

Input may be provided to the controller 1220 for use with the state estimator module 1220E from, for example, one or more of the wheel encoders 381, 382, the line following sensors 380A, 380B and the inertial sensor 389 (FIG. 8, Block 18000). Input may also be provided to the controller for use with the state estimator from slat sensors (e.g. sensors that sense the storage shelf slats). An example, of storage slat sensors can be found in U.S. Provisional Patent Application No. 61/423,206, entitled "BOT POSITION SENSING" (-#1), previously incorporated by reference herein.

In the embodiments the bot may have, for example, a steady state of operation (e.g. no acceleration/deceleration) and a dynamic state of operation (e.g. during acceleration/deceleration). During steady state operation with the differential motor torque T substantially equal to zero the state estimator may obtain data for longitudinal position Y and longitudinal speed $\dot{y}$ from, for example, wheel odometry as described above (FIG. 8, Block 18001). It is noted that the longitudinal speed $\dot{y}$ may be obtained from the wheel encoders using, for example, a Kalman or other suitable filter accounting for wheel slip as described above. Lateral position X and lateral speed $\dot{x}$ may be obtained from, for example, the line following sensors 380A, 380B when the line following sensors 380A, 380B at, for example, the front and rear of the bot 110 cross the lines 393, 394, 391. The lateral position X of the bot and the yaw angle α can be calculated from the front and rear positions of the bot 110 as determined by the sensors 380A, 380B when the sensors cross the lines 393, 394, 391 (FIG. 8, Block 18002). In one example, between line 393, 394, 391 crossings the differential movement of the wheels (as determined from e.g. wheel encoders or other suitable sensors) indicate rotation or yaw of the bot. In another example, between line 393, 394, 391 crossings the rotation or yaw angle α of the bot 110 may be determined from a dynamic model in, for example, an extended Kalman filter. The lateral speed $\dot{x}$ can be determined by the state estimator, for example, as follows:

$$\dot{x} = \dot{y} \tan \alpha$$

where $\dot{y}$ may be verified using, for example, crossing locations R, P or any other suitable transverse datum lines similar to guide lines 393, 394, 391.

Referring also to FIG. 4A-4E, in one exemplary embodiment the controller 1220 may command actuation of the actuators 420 for unlocking the casters 1262 based on the state of the bot 110 so that quick steering response can be obtained for correcting the yaw angle α of the bot. The yaw angle α of the bot may also be corrected with the casters locked, which may provide a slower steering response with more bot stability. The controller 1220 may know (via the state estimator module 1220E) an estimate of the differential torque T to apply to the drive wheels 1211, 1212 so that a maximum differential torque T can be applied to the drive wheels 1211, 1212 for correcting the yaw angle α of the bot 110. It is noted that the estimate for the transverse speed $\dot{x}$ (or any other suitable kinematics of the bot) can be updated (FIG. 8, Block 18003) at any suitable time such as when, for example, there is no line sense signal from speed $\dot{y}$ and yaw angle α. The yaw angle α and the rate of change of the yaw angle $\dot{α}$ can be estimated using, for example, the inertial sensor 389.

Once the differential torque T is applied based on the estimated value of the yaw angle α, the controller 1220 waits to receive a guide line sense signal from one or more of the line following sensors 380A, 380B. When the line sense signal is received, the controller 1220 may command a reduction in differential torque T and continue to update the kinematic information of the bot 110 until the yaw angle α is at a predetermined value such that the bot is substantially travelling along the desired guide line 391-395. It is noted that the differential torque T may be reduced proportionately to the approach rate (e.g. $\dot{x}$, $\dot{α}$) to, for example, the center of the guide line 391-395. When the differential torque T is reduced to substantially zero the bot is travelling in a substantially straight line enabling the casters to lock into their locked configuration as described above (e.g. the locking feature 440L may ride along the side surface 450S of the second locking member 450 until it is substantially aligned with and engages one of the slots 450S1, 450S2. It is noted that when the differential torque T is applied, the transverse position X and speed $\dot{x}$ may be determined by the controller 1220 (via the state estimator module 1220E) from, for example, a mean of the wheel encoder signals where the differential torque T is known and the wheel encoder signals (from each drive wheel 1211, 1212) are related to one another (or otherwise weighted) based on the differential torque T such that, for example, a difference of inner to outer wheel encoder signals (depending on which way the bot is turning where the inner encoder is on the inside of the turn) is applied to the encoder signal based on the magnitude of the differential torque T.

In the dynamic state of bot operation, e.g. where the bot 110 is undergoing positive acceleration or negative acceleration (i.e. deceleration) and the differential torque T is substantially zero or greater than zero the kinematic state of the bot may be determined in a manner substantially similar to that described above with respect to the steady state of bot operation. It is noted that where travel of the bot 110 is guided by a contact linear guide system (e.g. tracks or rails) as in, for example, the picking aisles 130A (see for example, U.S. patent application Ser. No. 12/757,312, entitled "AUTONOMOUS TRANSPORTS FOR STORAGE AND RETRIEVAL SYSTEMS," previously incorporated herein) there is no data sent to the controller 1220 by, for example, the line following sensors 380A, 380B. As such, the state estimation of the bot 110 within the contact linearly guided travel areas is only in the longitudinal direction. The position of the bot 110 within the picking aisles may be determined by the state estimator (without direct wheel encoder readings) in combination with, for example, the storage shelf slat location validation as described in U.S. Provisional Patent Application No. 61/423,206 entitled "BOT POSITION SENSING" (-#1), previously incorporated by reference herein.

In a first aspect of the embodiments an autonomous transport vehicle for transporting items in a storage and retrieval system is provided. The autonomous transport vehicle includes at least two drive wheels and a controller, where each drive wheel is independently driven and a drive wheel encoder is disposed adjacent each drive wheel. The controller, in communication with the encoders, is configured to determine a kinematic state of the autonomous transport vehicle within the storage and retrieval system based on incremental data from the drive wheel encoders only and independent of drive wheel slippage.

In accordance with a first aspect of the first aspect of the embodiments, the controller is configured to determine command logic for operating the autonomous transport vehicle based on the kinematic state.

In accordance with the first aspect of the first aspect of the embodiments, the autonomous transport vehicle includes one or more of a wheel encoder for each drive wheel, an inertial sensor, at least one storage slat sensor and at least one line following sensor, wherein the controller is configured to receive data from the one or more of the wheel encoder for each drive wheel, the inertial sensor, the at least one storage slat sensor and the at least one line following sensor for determining the kinematic state.

In accordance with a second aspect of the first aspect of the embodiments, the controller is further configured to determine a position of the autonomous transport vehicle within the storage and retrieval system independent of drive wheel slippage.

In accordance with the second aspect of the first aspect of the embodiments, the controller is configured to determine the position of the autonomous transport vehicle based on a drive wheel having a lowest velocity of the at least two drive wheels when a positive torque is applied by the at least two drive wheels.

In accordance with the second aspect of the first aspect of the embodiments, the controller is configured to determine the position of the autonomous transport vehicle based on a drive wheel having a highest velocity of the at least two drive wheels when a negative torque is applied by the at least two drive wheels.

In accordance with the second aspect of the first aspect of the embodiments, the controller is configured with an extended Kalman filter for filtering spurious data from each of the encoders.

In accordance the second aspect of the first aspect of the embodiments, the autonomous transport vehicle includes at least one line following sensor configured to sense guide lines on a surface of the storage and retrieval system, the controller being further configured to weight data from each of the encoders based on a guide line deviation signals provided by the at least one line following sensor.

In accordance the second aspect of the first aspect of the embodiments, wherein the controller is configured to verify a position of the autonomous transport vehicle by detecting one or more datum lines on a surface of the storage and retrieval system.

In accordance with the first aspect of the embodiments, the autonomous transport vehicle includes at least one releasably lockable caster wheel.

In accordance with a second aspect of the embodiments, an autonomous transport vehicle for transporting items in a storage and retrieval system is provided. The autonomous transport vehicle includes a frame, a controller, at least two independently driven drive wheels mounted to the frame and at least one caster wheel mounted to the frame and having a releasably lockable swivel lock. The controller being configured to lock and unlock the releasably lockable swivel lock during a transport of items through the storage and retrieval system based on a predetermined kinematic state of the autonomous transport vehicle.

In accordance with the second aspect of the embodiments, the controller is configured to individually drive the independently driven drive wheels based on command logic generated from a determination of the predetermined kinematic state of the autonomous transport vehicle.

In accordance with the second aspect of the embodiments, the controller is configured to apply a differential torque to the independently driven drive wheels for effecting curvilinear travel of the autonomous transport vehicle.

In accordance with the second aspect of the embodiments, the controller is configured to maintain the releasably lockable swivel lock in a locked state when a lateral position and yaw angle of the autonomous transport vehicle are below a predetermined deviation value.

In accordance with the second aspect of the embodiments, the controller is configured to unlock the releasably lockable swivel lock substantially during an application of differential torque to the independently driven drive wheels.

In accordance with a first aspect of the second aspect of the embodiments, the at least one caster wheel includes an actuator, a first locking member and a second locking member connected to a wheel of the at least one releasably lockable caster wheel, the actuator being configured for a pulse release of the first locking member from the second locking member for unlocking the releasably lockable swivel lock.

In accordance with the first aspect of the second aspect of the embodiments, the at least one caster wheel is configured such that the first locking member and second locking member are substantially aligned during substantially straight line travel of the autonomous transport vehicle and the first locking member is biased to automatically engage the second locking member for locking the releasably lockable swivel lock.

In accordance with the first aspect of the second aspect of the embodiments, wherein the autonomous transport vehicle has a longitudinal axis substantially aligned with the straight line travel of the autonomous transport vehicle and a lateral axis that is transverse to the longitudinal axis, the first locking member being configured to engage the second locking member in a lateral direction.

In accordance with a third aspect of the embodiments, an autonomous transport vehicle is provided. The autonomous transport vehicle includes at least two independently driven drive wheels, at least one releasably lockable caster wheel and a controller. The controller includes a state estimator configured to estimate a kinematic state of the autonomous transport vehicle wherein the controller issues control commands to the at least two independently driven drive wheels and the at least one releasably lockable casters based on the estimated kinematic state of the autonomous transport vehicle.

In accordance with the third aspect of the embodiments, the controller is configured to estimate a state of the autonomous transport vehicle based on data obtained from one or more sensors of the autonomous transport vehicle.

In accordance with a fourth aspect of the embodiments an autonomous transport vehicle for transporting items in a storage and retrieval system is provided. The autonomous transport vehicle includes a controller, at least one wheel encoder in communication with the controller and at least one line following sensor in communication with the controller and configured to detect guide lines disposed on a deck of the storage and retrieval system. The controller being configured to estimate a position of the autonomous transport vehicle within the storage and retrieval system using an extended Kalman filter and sensor data from the at least one wheel encoder. The controller is further configured to update the extended Kalman filter using sensor data from the at least one line following sensor so that an accuracy of the estimated position of the autonomous transport vehicle increases over previous estimated position determinations.

In accordance with a fifth aspect of the embodiments an autonomous transport vehicle for transporting items in a storage and retrieval system is provided. The autonomous transport vehicle including a controller, a frame, at least two driven wheels mounted to the frame and a wheel encoder for each of the driven wheels in communication with the controller and configured to detect rotation of a respective driven wheel. The controller being configured to determine a position of the autonomous transport vehicle within the storage and retrieval system from sensor data from an encoder for a driven wheel having the best wheel odometry of the at least two driven wheels.

It should be understood that the embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An autonomous transport vehicle for transporting items in a storage and retrieval system, the autonomous transport vehicle comprising:
    at least two drive wheels, each drive wheel being independently driven;
    a drive wheel encoder disposed adjacent each drive wheel; and
    a controller in communication with the encoders configured to identify a kinematic state of the autonomous transport vehicle within the storage and retrieval system based only on incremental data from the drive wheel encoders, received from each encoder, and independent of drive wheel slippage.

2. The autonomous transport vehicle of claim 1, wherein the controller is configured to determine command logic for operating the autonomous transport vehicle based on the kinematic state.

3. The autonomous transport vehicle of claim 1, wherein the autonomous transport vehicle includes one or more of a wheel encoder for each drive wheel, an inertial sensor, at least one storage slat sensor and at least one line following sensor, wherein the controller is configured to receive data from the one or more of the wheel encoder for each drive wheel, the inertial sensor, the at least one storage slat sensor and the at least one line following sensor for identifying the kinematic state.

4. The autonomous transport vehicle of claim 1, wherein the controller is further configured to determine a position of the autonomous transport vehicle within the storage and retrieval system independent of drive wheel slippage.

5. The autonomous transport vehicle of claim 4, wherein the controller is configured to determine the position of the autonomous transport vehicle based on a drive wheel having a lowest velocity of the at least two drive wheels when a positive torque is applied by the at least two drive wheels.

6. The autonomous transport vehicle of claim 4, wherein the controller is configured to determine the position of the autonomous transport vehicle based on a drive wheel having a highest velocity of the at least two drive wheels when a negative torque is applied by the at least two drive wheels.

7. The autonomous transport vehicle of claim 4, wherein the controller is configured with an extended Kalman filter for filtering spurious data from each of the encoders.

8. The autonomous transport vehicle of claim 4, wherein the autonomous transport vehicle includes at least one line following sensor configured to sense guide lines on a surface of the storage and retrieval system, the controller being further configured to weight data from each of the encoders based on a guide line deviation signals provided by the at least one line following sensor.

9. The autonomous transport vehicle of claim 4, wherein the controller is configured to verify a position of the autonomous transport vehicle by detecting one or more datum lines on a surface of the storage and retrieval system.

10. The autonomous transport vehicle of claim 1, wherein the autonomous transport vehicle includes at least one releasably lockable caster wheel.

11. A storage and retrieval system comprising:
    at least one autonomous transport vehicle including
        at least two drive wheels, each drive wheel being independently driven;
        a drive wheel encoder disposed adjacent each drive wheel;
        a controller in communication with the drive wheel encoders of the at least one autonomous transport vehicle and being configured to identify a kinematic state of the at least one autonomous transport vehicle within the storage and retrieval system based only on incremental data from the drive wheel encoders, received from each encoder, and independent of drive wheel slippage;
    wherein the controller periodically verifies the kinematic state along a travel path of the at least one autonomous transport vehicle wherein the period of verification is based on detection of a position datum having a predetermined position relative to a surface being traversed by the at least one autonomous transport vehicle.

12. The storage and retrieval system of claim 11, wherein the controller is configured to determine command logic for operating the at least one autonomous transport vehicle based on the kinematic state.

13. The storage and retrieval system of claim 11, wherein the at least one autonomous transport vehicle includes one or more of a wheel encoder for each drive wheel, an inertial sensor, at least one storage slat sensor and at least one line following sensor, wherein the controller is configured to receive data from the one or more of the wheel encoder for each drive wheel, the inertial sensor, the at least one storage slat sensor and the at least one line following sensor for verifying the kinematic state.

14. The storage and retrieval system of claim 11, wherein the controller is further configured to determine a position of the at least one autonomous transport vehicle within the storage and retrieval system independent of drive wheel slippage.

15. The storage and retrieval system of claim 14, wherein the controller is configured to determine the position of the at least one autonomous transport vehicle based on a drive wheel having a lowest velocity of the at least two drive wheels when a positive torque is applied by the at least two drive wheels.

16. The storage and retrieval system of claim 14, wherein the controller is configured to determine the position of the at least one autonomous transport vehicle based on a drive wheel having a highest velocity of the at least two drive wheels when a negative torque is applied by the at least two drive wheels.

17. The storage and retrieval system of claim 14, wherein the controller is configured with an extended Kalman filter for filtering spurious data from each of the encoders.

18. The storage and retrieval system of claim 14, wherein the at least one autonomous transport vehicle includes at least one line following sensor configured to sense guide lines on a surface of the storage and retrieval system, the controller being further configured to weight data from each of the encoders based on a guide line deviation signals provided by the at least one line following sensor.

19. The storage and retrieval system of claim 14, wherein the controller is configured to verify a position of the at least one autonomous transport vehicle by detecting one or more datum lines on a surface of the storage and retrieval system.

20. The storage and retrieval system of claim 14, wherein the at least one autonomous transport vehicle includes at least one releasably lockable caster wheel.

21. A method for controlling an autonomous transport vehicle within a storage and retrieval system comprising: receiving incremental data from at least two drive wheel encoders, each drive wheel encoder being disposed adjacent a corresponding one of at least two drive wheels of the autonomous transport vehicle; identifying a kinematic state of the autonomous transport vehicle within the storage and retrieval system based only on incremental data from the at least two drive wheel encoders independent of drive wheel slippage; and periodically verifying the kinematic state along a travel path of the autonomous transport vehicle wherein the period of verification is based on detection of a position datum having a predetermined position relative to a surface being traversed by the autonomous transport vehicle; and determining a command logic for operating the autonomous transport vehicle based on the kinematic state; and issuing the command.

22. The method of claim 21, wherein verifying the kinematic state of the autonomous transport vehicle is further based on data from each of the at least two wheel encoders for each drive wheel, an inertial sensor, at least one storage slat sensor and at least one line following sensor.

23. The method of claim 21, further comprising determining a position of the autonomous transport vehicle within the storage and retrieval system independent of drive wheel slippage.

24. The method of claim 23, further comprising determining the position of the autonomous transport vehicle based on a drive wheel having a lowest velocity of the at least two drive wheels when a positive torque is applied by the at least two drive wheels.

25. The method of claim 23, further comprising determining the position of the autonomous transport vehicle based on a drive wheel having a highest velocity of the at least two drive wheels when a negative torque is applied by the at least two drive wheels.

26. The method of claim 23, further comprising filtering spurious data from each of the at least two wheel encoders with an extended Kalman filter.

27. The method of claim 23, further comprising sensing a guide line on a surface of the storage and retrieval system with the at least one line following sensor and weighting data from each of the at least two wheel encoders based on guide line deviation signals provided by the at least one line following sensor.

28. The method of claim 27, further comprising verifying the position of the autonomous transport vehicle by detecting one or more datum lines on the surface of the storage and retrieval system.

* * * * *